(12) United States Patent
Lewbel (10) Patent No.: US 9,823,890 B1
(45) Date of Patent: Nov. 21, 2017

(54) MODIFIABLE BEZEL FOR MEDIA DEVICE

(71) Applicant: Amazon Technologies, Inc., Reno, NV (US)

(72) Inventor: Hannah Rebecca Lewbel, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 68 days.

(21) Appl. No.: 13/827,077

(22) Filed: Mar. 14, 2013

(51) Int. Cl.
*G09G 5/00* (2006.01)
*G06F 3/14* (2006.01)

(52) U.S. Cl.
CPC .................................. *G06F 3/1446* (2013.01)

(58) Field of Classification Search
CPC .... G06F 3/1446; G06F 3/1454; G06F 3/1423; G09G 2300/026; G09G 2370/16; G09G 2300/02; G09G 2360/06; G09G 2300/023; G09G 2356/00; G09G 2360/04; G09G 3/3426; G09F 9/3026; G02F 1/13336; H04N 9/3147
USPC ........................... 345/1.1–3.1, 156, 173–174
See application file for complete search history.

(56) References Cited

U.S. PATENT DOCUMENTS

| | | | | |
|---|---|---|---|---|
| 8,823,640 B1* | 9/2014 | Harris | ............................ | 345/156 |
| 8,830,392 B2* | 9/2014 | Li | ............................ | H04N 11/20 |
| | | | | 345/604 |
| 2010/0033402 A1* | 2/2010 | Yoshida | ................ | G06F 3/1446 |
| | | | | 345/1.3 |
| 2010/0110019 A1* | 5/2010 | Ozias | .................. | G06F 3/03547 |
| | | | | 345/173 |
| 2011/0316807 A1* | 12/2011 | Corrion | ................. | G06F 3/0416 |
| | | | | 345/174 |
| 2013/0271447 A1* | 10/2013 | Setlur | ................... | G06F 1/1626 |
| | | | | 345/418 |
| 2013/0335453 A1* | 12/2013 | Lim et al. | ..................... | 345/661 |
| 2014/0002327 A1* | 1/2014 | Toren | .................... | G06F 3/1423 |
| | | | | 345/1.1 |
| 2014/0125697 A1* | 5/2014 | Suito | ..................... | G06F 3/0488 |
| | | | | 345/629 |
| 2014/0184512 A1* | 7/2014 | Okuley et al. | ............... | 345/168 |
| 2014/0253417 A1* | 9/2014 | Brown | ................. | G06F 3/1446 |
| | | | | 345/2.3 |

* cited by examiner

*Primary Examiner* — Rodney Amadiz
(74) *Attorney, Agent, or Firm* — Lee & Hayes, PLLC (57) ABSTRACT

Embodiments of methods, systems and storage media associated with modification of non-active bezels on touchscreens of portable computing devices, such as tablet computers are described herein. A tablet computer with a touchscreen may incorporate a bezel that may provide a non-active area where a user may grip or otherwise touch the tablet computer without activation of the touchscreen. The bezel may surround, or otherwise form an edge of, an active area of the touchscreen. The bezel may be a virtual bezel that is displayed on the touchscreen, or may be a mechanical bezel that covers or otherwise limits access to the touchscreen. The tablet computer may modify the size and/or shape of the bezel based after detecting interactions by a user with the device that indicate a desire to change the shape and/or size of the active area of the touchscreen.

22 Claims, 8 Drawing Sheets

MODIFIABLE BEZEL FOR MEDIA DEVICE

BACKGROUND

Modern portable computing devices, such as tablet computers, offer the ability to display content in many flexible ways. This flexibility has increased as manufacturing techniques have improved screen sizes and decreased the need for additional housings or other non-screen area outside of the screen. As such, the ability of manufacturers to produce portable devices where screens (and/or touchscreens) run very near to the edge of the device, or even from edge to edge, is improving with each day.

However, even with such potentially spacious screens, limitations may remain on the portable devices' ability to display content. For example, even edge-to-edge screens are finite, and therefore present a limitation on size of content that may be viewed. In another example, as screens, and in particular touchscreens, grow to take over the face of portable devices, users may find themselves less able to physically manipulate and/or hold the portable devices without activating portions of the touchscreen. While designated inactive holding areas may be utilized, these holding areas may further limit the ability to display content in a flexible manner.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Techniques described herein provide for modification of non-active bezels on touchscreens of portable computing devices, such as tablet computers. While various portable computers may implement techniques described herein, examples are given with reference to tablet computers for the sake of clarity.

A tablet computer with a touchscreen may incorporate a bezel that may provide a non-active area where a user may grip or otherwise touch the tablet computer without activation of the touchscreen. The bezel may surround, or otherwise form an edge of, an active area of the touchscreen. The bezel may be a virtual bezel that is displayed on the touchscreen, or may be a mechanical bezel that covers or otherwise limits access to the touchscreen. The tablet computer may modify the size and/or shape of the bezel based after detecting interactions by a user with the device that indicate a desire to change the shape and/or size of the active area of the touchscreen.

In a first example, multiple tablet computers with bezels may be brought physically close together such that they touch at a common side. The tablet devices may detect that they have been brought close together and, in response, may remove the bezel at the common edge from each device. The tablet computers may then cooperate to display content in a common active display area formed by the merger of the two active display areas of the two tablet devices. The content may be displayed divided between the two tablet computers or on one of the tablet computers based on preferences for displaying the content. This shared display may provide additional uninterrupted area for a user to view content.

In another example, a tablet computer may detect that a user is holding the tablet computer by a certain portion of the touchscreen. The tablet computer may, in response, modify a displayed bezel to include the area at which the user is holding the tablet. This modification of the bezel may prevent unwanted activation of the touchscreen by the user, while giving the user a visual indication that the non-active area defined by the bezel now includes the held portion.

Figure 1:
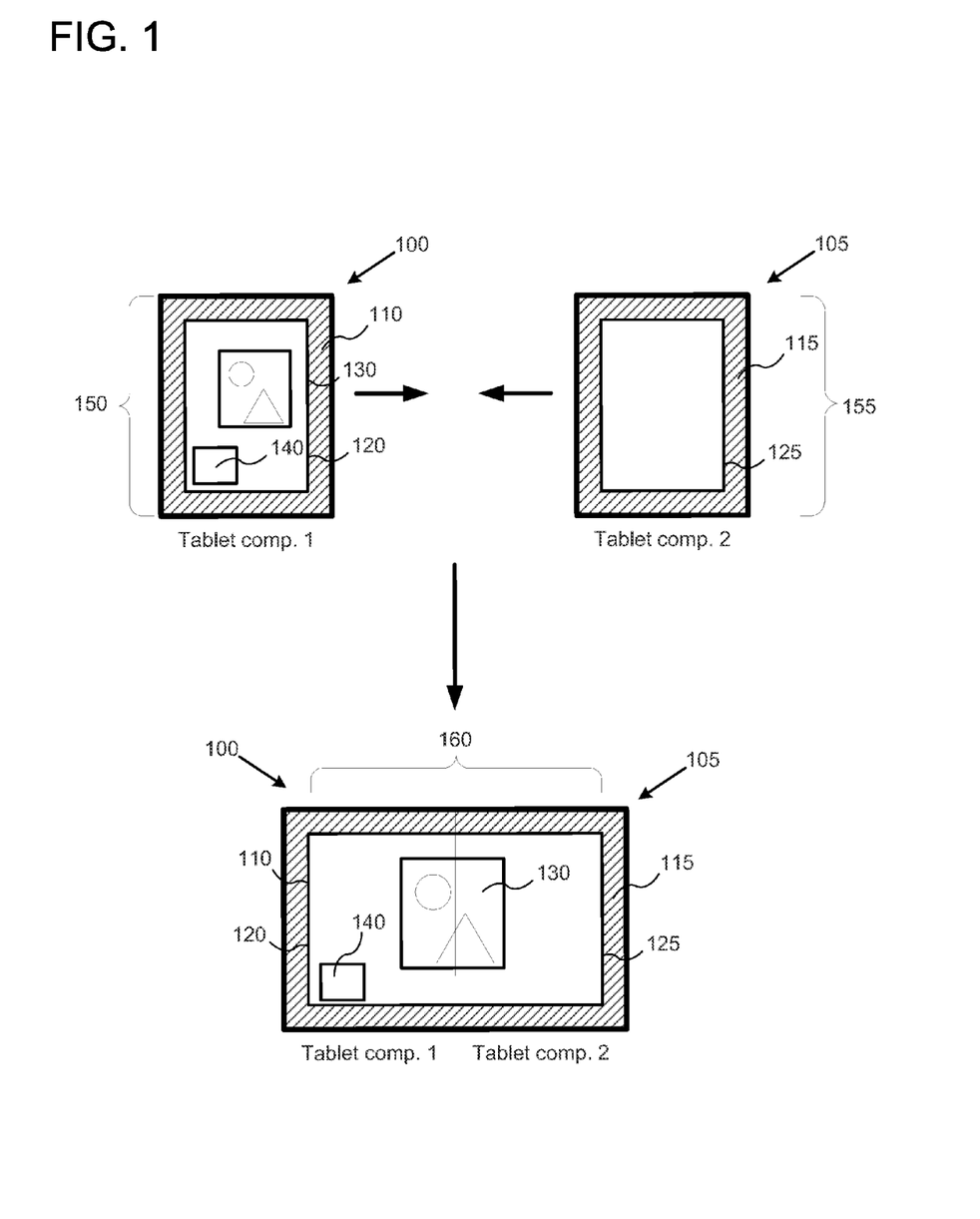
FIG. 1 is a block diagram illustrating an example of bezels on tablet computers disappearing in response to proximity of other tablet computers in accordance with various embodiments.

FIG. 1 is a block diagram illustrating an example of bezels on tablet computers disappearing in response to proximity of other tablet computers in accordance with various embodiments. As illustrated in FIG. 1, a tablet computer 100 may include a screen 150. The screen 150 may be active to touch, thus providing users with the ability to activate the tablet computer to perform actions via one or more touch gestures. In the illustrated example of FIG. 1, the screen of the tablet computer 100 extends to every edge of the tablet computer 100; in other embodiments, the screen 150 may not extend to every edge of the tablet computer 100, or may not extend to any edges of the tablet computer 100.

The screen 150 may include an active display area 120. The active display area 120 may be configured to display content, such as content elements 130 and 140. The active display area 120 may also be configured to be active to touch gestures, as described herein. The tablet computer 100 may also display a bezel 110, which may be configured as a non-active area. This non-active area displaying the bezel 110 may not respond to touch gestures in some embodiments, or may be less responsive to touch gestures than other areas of the screen 150. The bezel 110 may be denoted by through display of a color or pattern on the screen 150 that denotes that the bezel 110 is non-active and may be safely manipulated by a user. In other embodiments, the bezel 110 may include mechanically-activated portions of the body of the tablet computer 110, such as flaps or other physical overlays, which may prevent touch activation at the area covered by the bezel 110.

Another tablet computer 105, is also illustrated in FIG. 1. This tablet computer may also include a screen 155, active display area 125, and bezel 115, as illustrated. The two tablet computers 100 and 105 may be configured to detect each other's presence when they are brought in close physical proximity to one another. In various embodiments, this detection may be performed via various wireless techniques, such as, but not limited to, Bluetooth, near field communications ("NFC"), Wi-Fi, infrared communications, etc. In other embodiments, the tablet computers 100 and 105 may detect each other's presence through the use of magnets placed in the body of the tablet computers 100 and 105, along with corresponding magnetic sensors placed in the body of the tablet computers 100 and 105. In various embodiments, the tablet computers 100 and 105 may be configured to detect each other's presence only when touching; in other embodiments, the tablet computers 100 and 105 may detect each others' presence when brought within a pre-defined distance from each other.

As illustrated in FIG. 1, when the tablet computers 100 and 105 detect being brought in physical proximity to each other, subportions of the bezels 110 and 115 may disappear in response to detection. Thus, as illustrated in the example, subportions of the bezels 110 and 115 are no longer displayed in an area around the common edge where the two tablet computers 100 and 105 are touching. If the bezels 110 and 115 are displayed on the respective screens 150 and 155, the tablet computers 100 and 105 may be configured to cause subportions of bezels 110 and 115 to disappear by no longer displaying the subportions of bezels 110 and 115 that lie along the common edge. If the bezels 110 and 115 include mechanical flaps or overlays, the tablet computers 100 and 105 may be configured to physically manipulate the mechanical bezels 110 and 115 to move them from over the respective screens 150 and 155.

Further, the tablet computers 100 and 15 may be configured to modify display of content based on detection of each other's presence. For example, as illustrated in FIG. 1, the tablet computers 100 and 105 may be configured to increase the size of their respective active display areas 120 and 125 after removing the bezels 110 and 115. The tablet computers 100 and 105 may thus accept additional touch activity on the newly-active areas of the active display areas 120 and 125. Further, the tablet computers 100 and 105 may share content across the two display areas. For example, content element 130 is illustrated as being enlarged and shared across the two active display areas 120 and 125. By allowing content to be shared across the two active display areas 120 and 125, the tablet computers 100 and 105 may, in a sense, merge the two active display areas into a common active display area 160. This common active display area 160 may continue to be bounded by the bezels 110 and 115.

By contrast, however, not every piece of content may be shared; as illustrated, content element 140 may remain on active display area 120 and may not be shared on the active display area 125. In various embodiments, different content elements may thus be displayed differently based on preferences or settings of users, manufacturers, and/or content or software developers. It may also be noted that while the example of FIG. 1 shows two tablet computers, in various embodiments, other numbers of tablet computers and/or other portable computing devices may be used.

Figure 2:
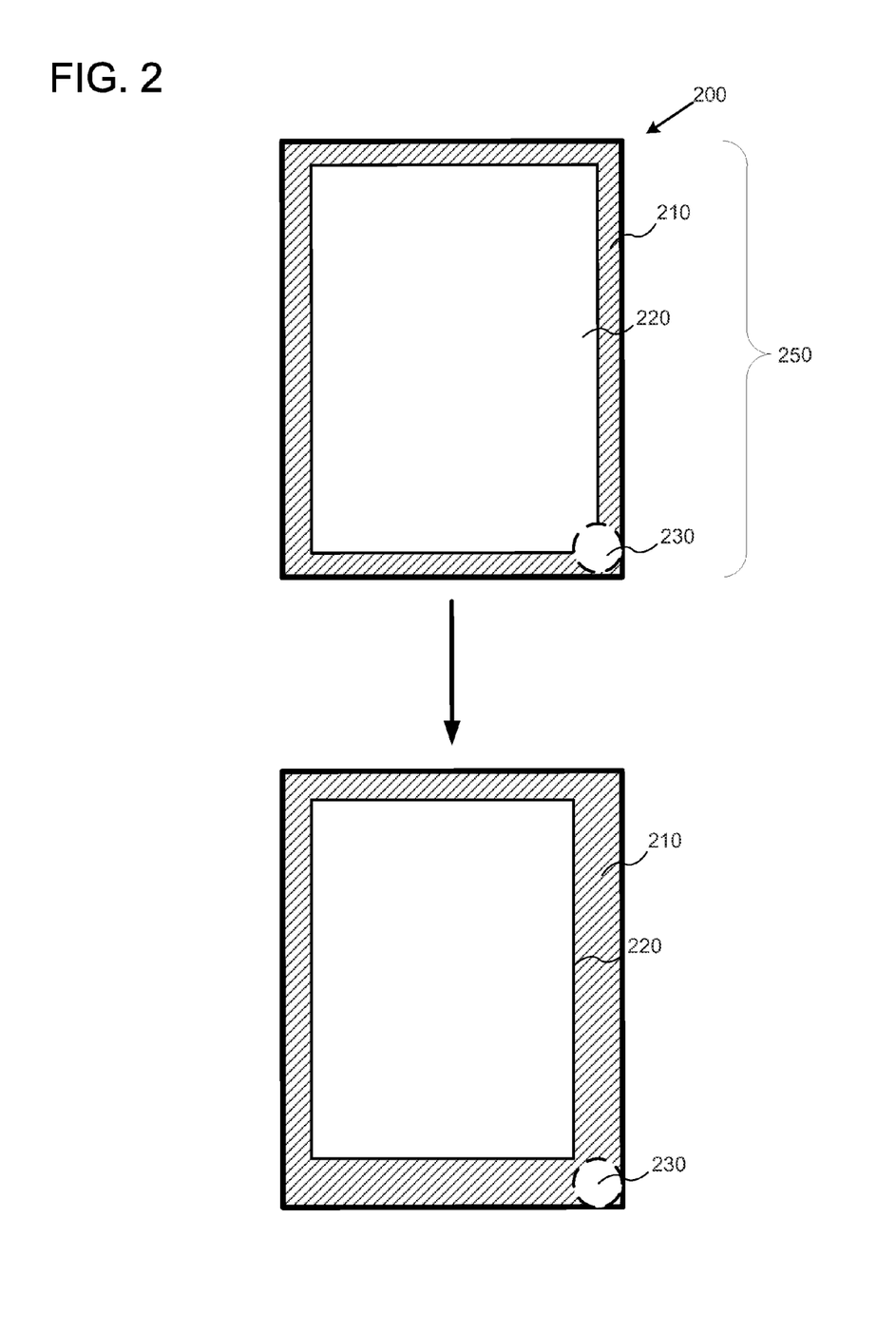
FIG. 2 is a block diagram illustrating an example of a tablet computer modifying a bezel based on a user's holding of the tablet computer in accordance with various embodiments.

FIG. 2 is a block diagram illustrating an example of a tablet computer 200 modifying a bezel based on a user's holding of the tablet computer in accordance with various embodiments. In the example of FIG. 2, a tablet computer 200 may include a bezel 210 and an active display area 220, similar to the bezel 110 and active display area 120 described above. This bezel 210 and active display area 220 may each be part of a screen 250. The tablet computer 200 may be held by user, such as at area 230. The tablet computer 200 may detect that the tablet computer 200 is being held through detection of prolonged contact with the area 230. In other embodiments, the tablet computer 200 may detect that the tablet computer 200 is being held using other techniques, such as through detection of an angle the tablet computer is being held at, or a lack of change in contact at a particular area. For example, if the tablet computer 200 were being held by a person wearing heavy gloves, the tablet computer 200 may detect that a particular area of the screen 250 is never being activated, and may determine that that area of the screen is being used by a user to hold the tablet computer 200. As illustrated, in response to detection of being held at area 230, the tablet computer 200 may modify the bezel 210 to include the area 230. Thus, in the example, after detection, the bezel 210 has been enlarged to include the area 230; this enlargement may be indicated by modifying the screen 250 to show a larger bezel area, such as when the bezel 210 is demarcated by a different color and/or pattern than the active display area 220.

Figure 3:
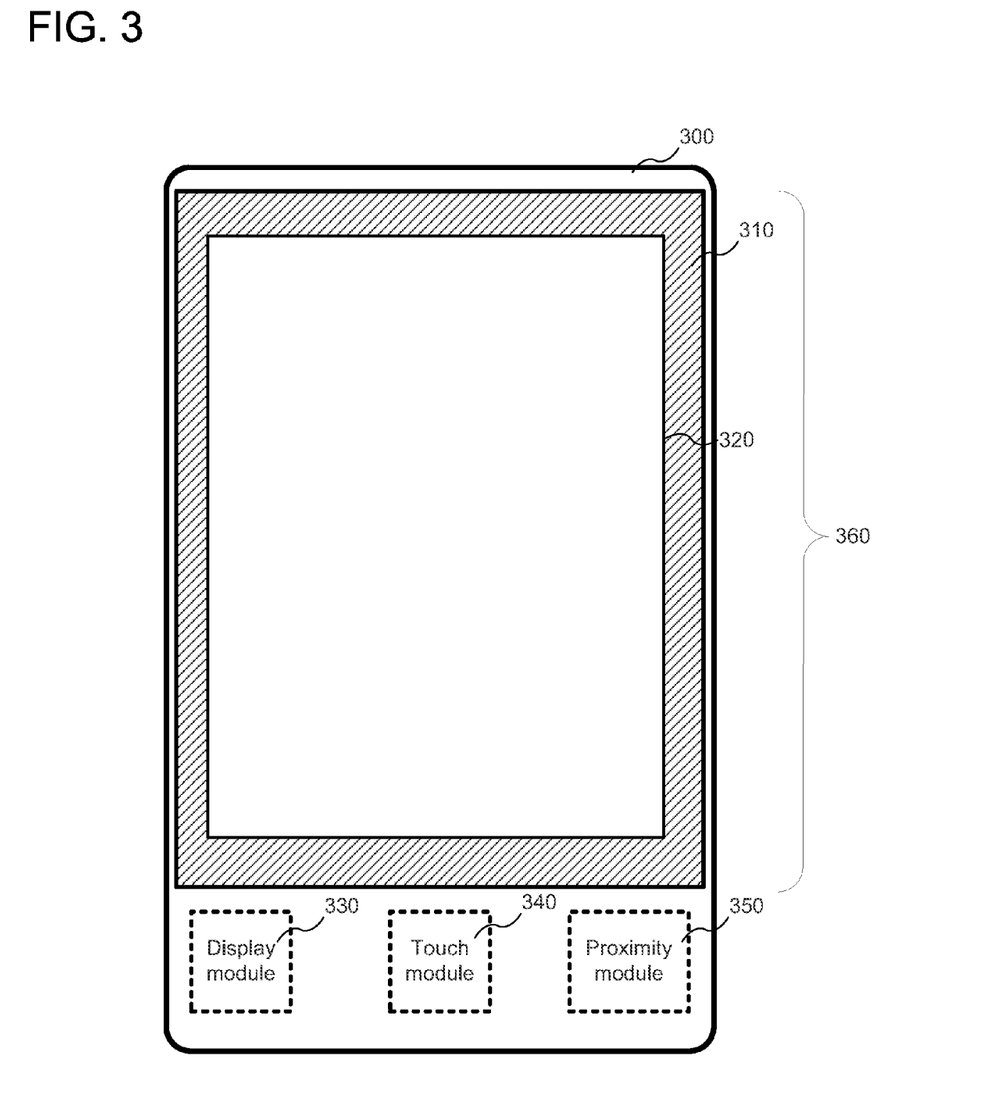
FIG. 3 is a diagram of an example tablet computer with modifiable bezels in accordance with various embodiments.

FIG. 3 is a diagram of an example tablet computer 300 with a modifiable bezel 310 in accordance with various embodiments. It may be noted that the examples of FIGS. 1 and 2 illustrated example tablet computers 100, 105, and 200 that had screens that extended to all edges of the tablet computers 100, 105, and 200. In contrast, the example tablet computer 300 of FIG. 3 includes a screen 360 includes both the bezel 310 and the active display area 320. However, as illustrated, the screen 360 does not extend to each edge of the tablet computer 300. Thus, according to various embodiments, the bezel 310 may be modified based on user interactions even when the screen 360 (and thus the bezel 310) does not extend to every edge of the tablet computer 300. For example, if the bezel 310 were to be modified to disappear, similar to the example of FIG. 1, after detecting the presence of another tablet computer next to tablet computer 300, the bezel may disappear, but there may still be an area of the tablet computer 300 that can be seen in between the two screens of the two tablet computers. In the example of FIG. 2, the bezel 310 may be modified to include an area by which the tablet computer 300 is being held regardless of whether the screen 360 extends to every edge or not.

Additionally, as shown in in FIG. 3, the tablet computer 300 may include one or more software and/or hardware modules to perform various actions described herein. For example, the tablet computer may include a display module 330. The display module 330 may be configured to display content on the active display area 320 of the tablet computer 300. The display module 330 may also be configured to display the bezel 310, in those embodiments where a displayed bezel is used. In such embodiments, a color, pattern, and/or animation may be displayed on the bezel 310 to differentiate it from the active display area 320. In other embodiments, mechanical flaps or overlays may be used to provide the bezel 310, and the display module 330 may limit display to the active display area 320.

The tablet computer 300 may also include a touch module 340. The touch module 340 may be configured to receive indications of touch gestures from a user interacting with the tablet computer 300. In embodiments where the bezel 310 is displayed on the screen 360, the touch module 340 may be configured to accept fewer touch gestures from the bezel 310 than from the active display area 320. For example, if the touch module 340 is configured to accept a set of touch gestures at the active display area 320, then the touch module 340 may be configured to accept a smaller set of touch gestures at the bezel 310. In other embodiments, the touch module 340 may be configured to accept no touch gestures at all at the bezel 310. The touch module 340 may also be configured to detect that a particular area of the screen 360 is being used by a user to hold the tablet computer 300.

The tablet computer 300 may also include a proximity module 350. The proximity module 350 may be configured to detect that another tablet computer is physically proximate to the tablet computer 300. The proximity module 350 may be configured to perform such detection based on information received via wireless communications with other devices. Thus, in some embodiments, the proximity module 350 may be configured to communicate with wireless communications software and hardware, such as Bluetooth, NFC, Wi-Fi, infrared communications, etc. to detect and determine proximity of another tablet computer. In some embodiments, the proximity module 350 may be configured to detect the presence of another tablet computer by detecting responses of magnetic switches in the tablet computer 300; these switches may be paired with magnets in another tablet computer such that they are activated when the other tablet computer is physically proximate to the tablet computer 300. In other embodiments, other techniques for detecting physical proximity of another tablet computer may be used.

Figure 4:
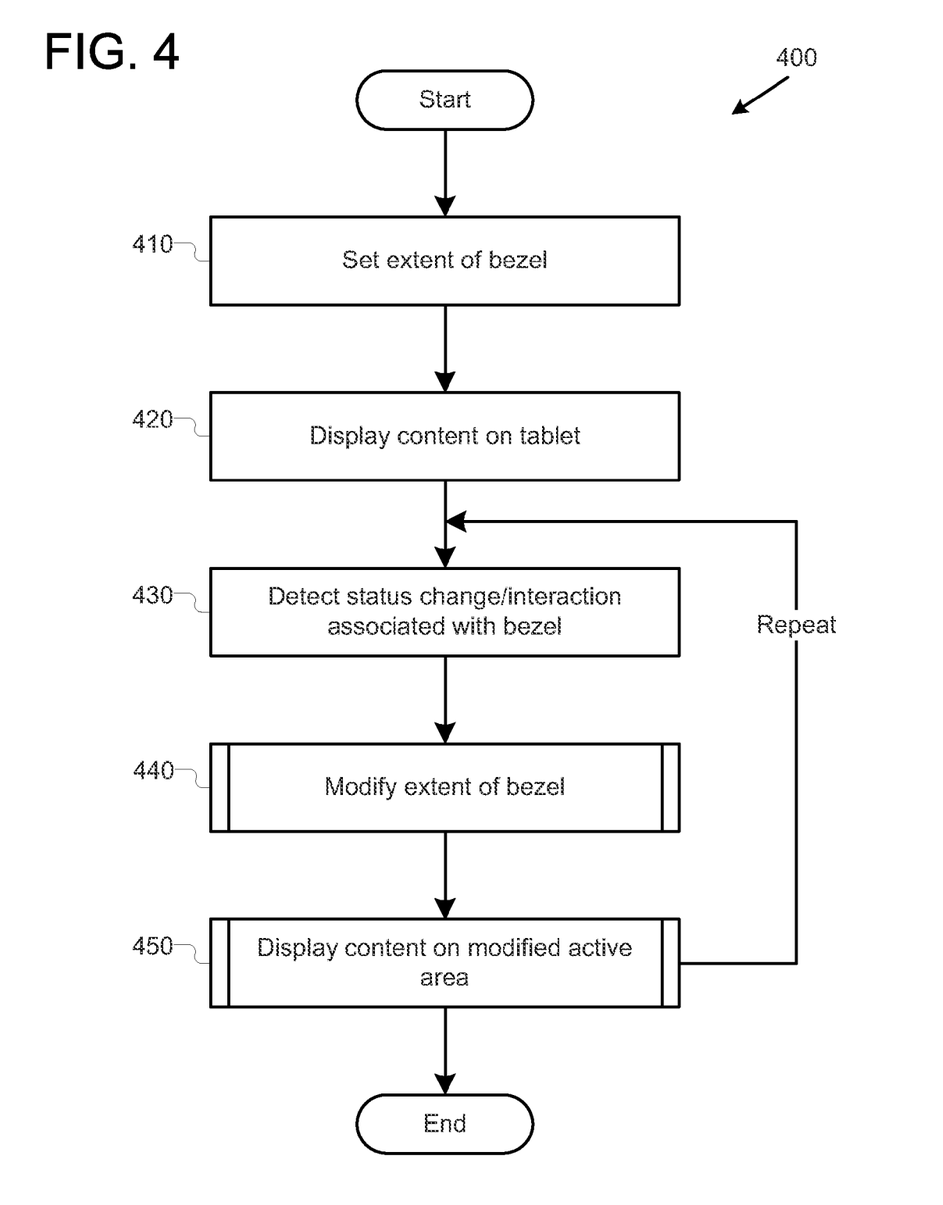
FIG. 4 illustrates an example process for the tablet computer to detect a desired change and modify a bezel in accordance with various embodiments.

FIG. 4 illustrates an example process 400 for the tablet computer 300 to detect a desired change and modify a bezel 310 in accordance with various embodiments. It may be noted that operations of FIG. 4 are described with reference to tablet computer 300; however, in various embodiments, other examples of portable computing devices, such as illustrated tablet computers 100, 105, and/or 200, and/or other devices, may implement the processes described herein.

The process may begin at operation 410, where the tablet computer 300 may set an extent of the bezel 310. The tablet computer 300 may set extent through setting, for example, the size and shape of the bezel 310 based on various factors, such as user preference, manufacturer preference, content requirements, etc. Next, at operation 420, content may be displayed on the tablet computer 300. The content displayed may include various types of content, including textual, image, and/or visual content, and may be displayed in a static or dynamic manner.

At operation 430, the tablet computer 300 may detect a change in the status of the tablet computer 300 that is associated with the bezel. In various embodiments, the change in status of the tablet computer 300 may be an interaction with the tablet computer, such as a user interaction, an interaction with another tablet computer or other computing device, or an interaction with content on the tablet computer 300. In some embodiments, this interaction may be detection of the physical proximity of another tablet computer, as described above. In various embodiments, this physical proximity of the other tablet computer may indicate an interaction by a user to merge active display areas of the two tablet computers. In another embodiment, at operation 430, the tablet computer 300 may detect that a user is holding the tablet computer 300 at a particular area. In various embodiments, this detection may indicate that the tablet computer exclude the held area from its active display area (since, for example, the area being held cannot be easily seen).

Next, at operation 440, the tablet computer 300 may modify the extent of the bezel 310. For example, the tablet computer 300 may modify an extent of the bezel by modifying edges and or areas covered by the bezel. Particular examples of bezel modification are described below with reference to FIGS. 5 and 7. Next, at operation 450, the tablet computer 300 may display content on the modified active display area(s). Particular examples of displaying content are described below with reference to FIG. 6. In various embodiments, all or part of process 400 may repeat based on new interactions. For example, as illustrated, the process may return to operation 430, where a new status change or interaction may be detected, such as by new interactions with a current user, or with other users. Operations 440 and 450 may then be repeated in response to the detection. In other embodiments, different portions of process 400 may be repeated. In other embodiments, the process may then end.

Figure 5:
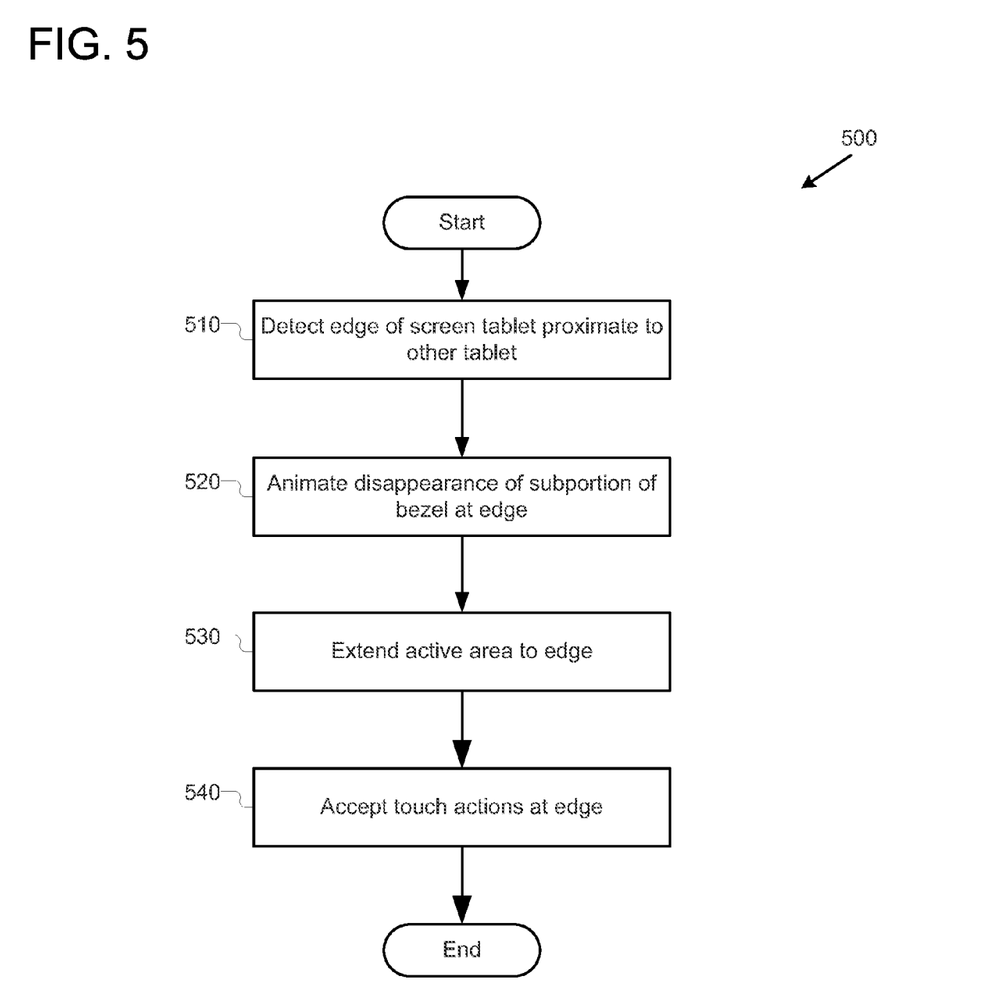
FIG. 5 illustrates an example process for the tablet computer to modify extents of bezels based on proximity of another tablet computer in accordance with various embodiments.

FIG. 5 illustrates an example process 500 for the tablet computer 300 to modify the extent of bezel 310 based on proximity of another tablet computer in accordance with various embodiments. Process 500 may include one or more implementations of operation 440 of process 400 of FIG. 4. The process may begin at operation 510, where the tablet computer may detect which edge of the screen is proximate to the other tablet computer, such as through action of the proximity module 350. As discussed above, this detection may be made via a variety of methods, including physical and wireless communications between the tablet computers.

Next, at operation 520, the tablet computer 300 may modify the extent of the bezel by animating disappearance of a subportion of the bezel 310 at the previously detected edge, such as through action of the display module 330. For example, the tablet computer may animate that a subportion of the bezel 310 that is adjacent to the previously detected edge slides away into the side of the screen 360 as the tablet computers are moved closer together. This animation may be linearly related to the distance between the tablet computers, or may be performed in a non-linear fashion. In other embodiments, the tablet computer 300 may not animate disappearance of the bezel 310 at all, and may simply remove a subportion of the bezel 310 from the screen 360 upon contact of the two tablet computers or when a pre-set distance threshold is reached. In embodiments where a mechanical bezel 310 is used, the tablet computer 300 may cause the mechanical bezel to move out from in front of the screen rather than animate disappearance on the screen.

Next, at operation 530, the tablet computer 300 may extend the active display area to the previously detected edge, such as through action of the display module 330. At operation 540, the tablet computer 300 may begin to accept touch gestures at the previously detected edge, such as through action of the touch module 340. In some embodiments, through performance of operations 530 and 540, the tablet computer 300 may thus add the area previously covered by the bezel 310 to the active display area, both for interacting with the tablet computer 300 and for viewing content on the screen 360. The process may then end.

Figure 6:
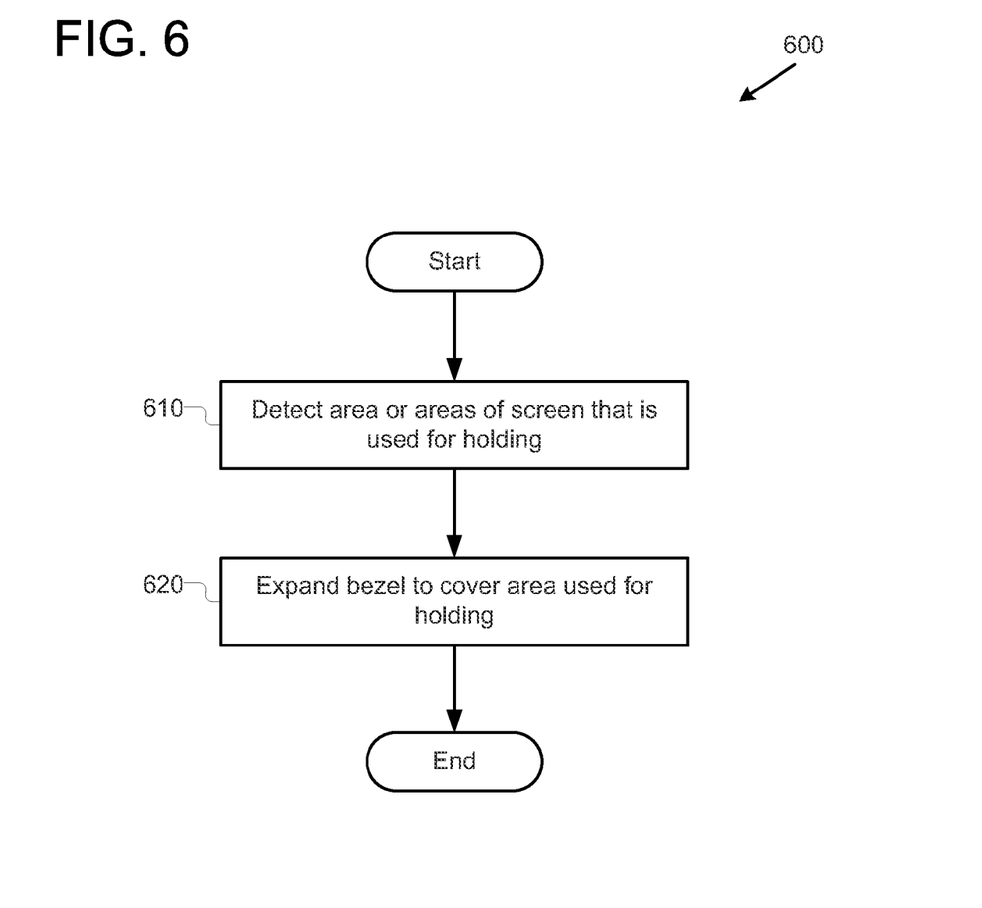
FIG. 6 illustrates an example process for the tablet computer to modify bezels based on a user holding the tablet computer in accordance with various embodiments.

FIG. 6 illustrates an example process 600 for the tablet computer to modify bezels based on a user or users holding the tablet computer in accordance with various embodiments. Process 600 may include one or more implementations of operation 440 of process 400 of FIG. 4. The process may begin at operation 610, where the tablet computer 300, such as through action of the touch module 340, may detect an area or areas of the screen that is being used by a user or users to hold the tablet computer. As described herein, this detection may be performed due to detection of one or more extended touches by a user or users. In another example, the detection may include an extended lack of touch of an area or areas. In other embodiments, the tablet computer 300 may detect an area or areas that are being used for holding based on non-touch detection, such as by detecting an orientation or movement of the tablet computer 300 that is indicative of the tablet computer being held by a particular side or area. Next, at operation 620, the tablet computer 300 may expand the bezel 310 to include the area or areas used for holding the tablet computer 300, such as through action of the display module. The process may then end.

Figure 7:
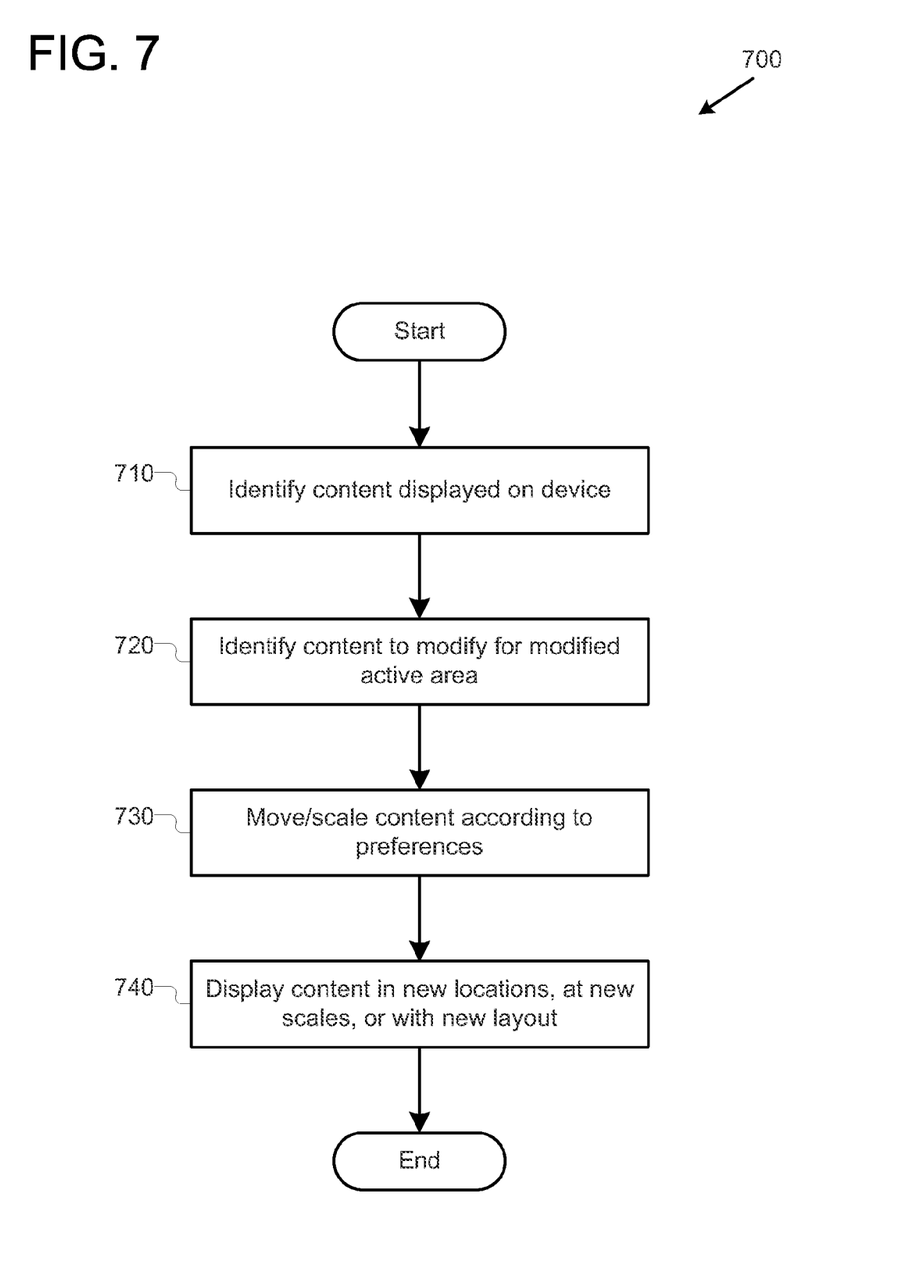
FIG. 7 illustrates an example process for the tablet computer to display content on a modified active display area, in accordance with various embodiments.

FIG. 7 illustrates an example process 700 for the tablet computer to display content on a modified active display area, in accordance with various embodiments. Process 700 may include one or more implementations of operation 450 of process 400 of FIG. 4. The process may begin at operation 710, where the tablet computer 300 may identify content that is displayed on the device. As discussed herein, in various embodiments, the content may include video, image, and/or textual content. Next, at operation 720, the tablet computer 300 may identify content to be modified for display on the modified active display area 320. In some embodiments, some or all content may not be modified, such as if a preference is saved for the content that directs that the content not be modified. For example, video content may be controlled by a content provider to only be displayed at a certain size or resolution, and therefore may be limited in the ways it can be modified. In another example, a user may have a saved preference that certain types of information may not be displayed on another device, and so that content may not be modified to display on another tablet computer.

Next, at operation 730, the tablet computer may move and/or scale content which was identified at operation 720. Next, at operation 740, the tablet computer 300 may display the modified content in new locations, at new scales, and/or with new layouts. In various embodiments, these operations may be performed by the display module 330. In some embodiments, the tablet computer 300 may perform the moving, scaling, and display on its own display. In some embodiments, the tablet computer 300 may request that the other tablet computer display the previously identified content. In such embodiments, the tablet computer 300 may provide the previously identified content, in whole or part, to the other tablet computer for display on the active display area of the other tablet computer. In other embodiments, the tablet computer 300 may control another tablet computer to display all or part of the previously identified content without directly providing the content to the other tablet computer. Thus, in such embodiments, the other tablet computer may display the modified content in coordination with the tablet computer 300 without having direct access to the content itself, such as when direct access would not be desirable for security or privacy reasons. In embodiments, where the content is displayed in a new layout, the layout may change from a single-screen to a multiple-screen layout. For example, an ebook that was displayed as a single page layout on tablet computer 300 may be displayed with a two-page layout on two tablet computers. In another example, content may change from a portrait layout to a landscape layout, or vice-versa. The process may then end.

Figure 8:
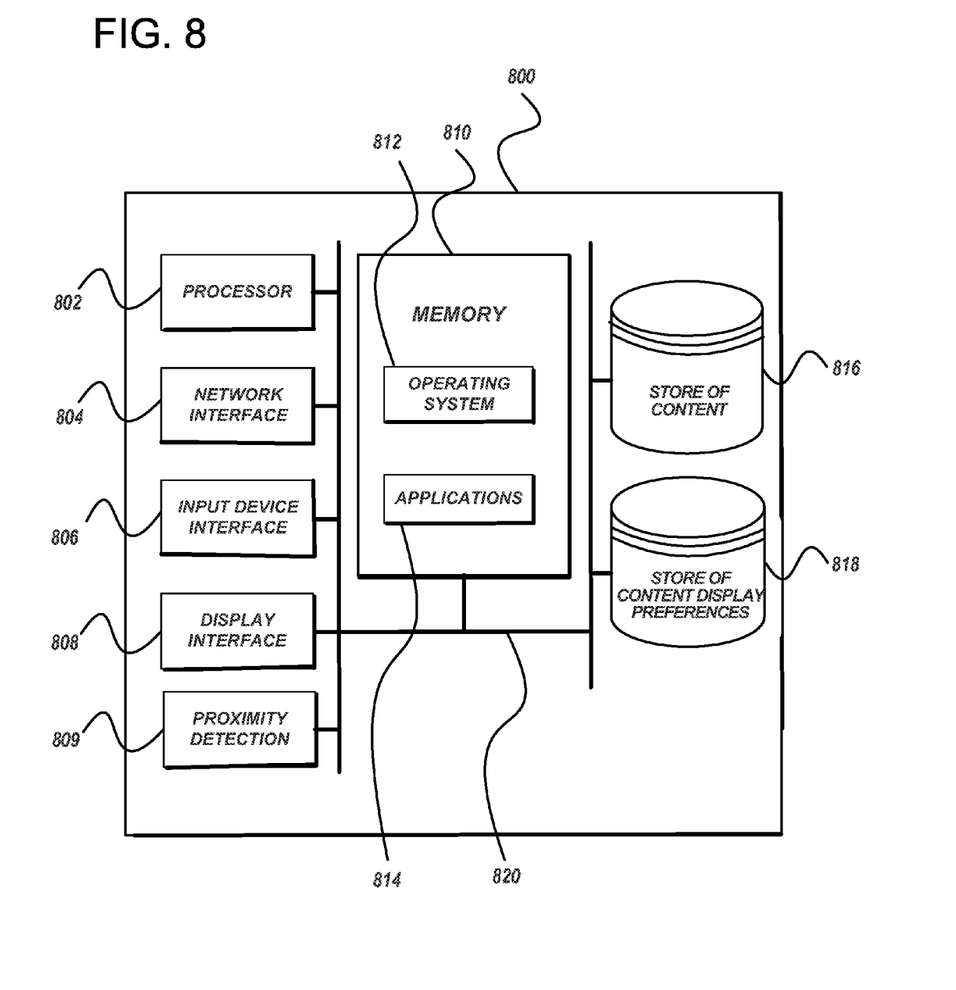
FIG. 8 illustrates an example computing environment in which embodiments described in the present disclosure may be implemented in accordance with various embodiments.

FIG. 8 illustrates an example environment (e.g., one or more computing devices) suitable for implementing mediated embodiments of the arrangement described herein in accordance with various embodiments.

The computing devices may include, but are not limited to, computers, portable computers, laptop or tablet computers, personal computers, and the like. The computing devices may also include specially configured computers for displaying content. For example, the environment may include a computing device 800 configured to identify modify bezels and display content as described above. The general architecture of a suitable computing device is described below in regard to FIG. 8. More particularly, FIG. 8 is a block diagram illustrating exemplary components of a computing device 800 suitable for modifying bezels and displaying content as described herein. However, the following description of the exemplary components of a computing device 800 should be viewed as illustrative only and not construed as limiting in any manner.

With regard to FIG. 8, the exemplary computing device 800 includes a processor 802 in communication with a variety of other components over a system bus 820. These other components may include, by way of example, a network interface 804, an input device interface 806, a display interface 808, proximity detection 809, and a memory 810. As appreciated by those skilled in the art, the network interface 804 enables the computing device 800 to communicate data, control signals, data requests and other information with other resources including computers, data sources, storage devices, and the like, on a computer network such as the Internet (not shown). The network interface 804 may be configured to communicate via wired or wireless connections. As one skilled in the art will appreciate, the computing device 800 may obtain an content from another computer or a storage device, such as the store of content 816, or other source via the computer network, as well as save content display preferences to a networked location or storage device, such as store 818, or send it to another computer on the network.

The input device interface 806, sometimes also embodied as an input/output interface, enables the computing device 800 to obtain data input from a variety of devices including, but not limited to, a digital pen, a touchscreen, a keyboard, a mouse, a scanner and the like. In addition to the exemplary components described above, a display interface 808 is used for outputting display information to a computer user. Typically, the display information is output by the display interface 808 via a display (e.g., an LCD screen, an e-ink screen, an integrated screen, sets of screens, etc.). Of course, while not shown, one skilled in the art will appreciate that a display device may be incorporated as an integral element within a computing device 800. Proximity detection 809 may interact with the proximity module 350 to enable the device 800 to detect the proximity of other computing devices. Proximity detection 809 may utilize wireless communication protocols (e.g., Bluetooth™, WiFi, near-field communications, etc.) or other detection capabilities, such as magnetic or electric detection.

The processor 802 is configured to operate in accordance with programming instructions stored in a memory 810. The memory 810 generally comprises RAM, ROM, and/or other permanent memory. Thus, in addition to storage in read/write memory (RAM), programming instructions may also be embodied in read-only format, such as those found in ROM or other permanent memory. The memory 810 typically stores an operating system 812 for controlling the general operation of the computing device 800. The operating system may be a general purpose operating system such as a Microsoft Windows®. operating system, a UNIX®. operating system, a Linux®. operating system, or an operating system specifically written for and tailored to the computing device 800. Similarly, the memory 810 also typically stores user-executable applications 814, or programs, for conducting various functions on the computing device 800. For example, the applications 814 in memory 810 may be configured according to modules 330, 340, and 350 described above in reference to FIG. 3.

The computing device 800 may optionally include a store of content 816 and store of content display preferences 818.

Techniques described herein may be implemented in a single application or module (e.g., applications 814) implemented on a computing device 800, or in a plurality of cooperating applications/modules (e.g., 330, 340, and 350) on a single computing device, or in a plurality of cooperating applications and/or modules distributed in a computer network. However, irrespective of the actual implementation and/or topography of the learning path identification system, the techniques described herein may be identified with regard to various logical components.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A computer-implemented method, comprising:
    causing, by a first tablet computer having a first touchscreen, display of a first bezel, the first bezel corresponding to a first area of the first touchscreen, wherein the first bezel is disposed along a first edge and at least one other edge of the first tablet computer;
    causing, by the first tablet computer, display of first content in a second area of the first touchscreen;
    receiving an indication that a second tablet computer having a second touchscreen is adjacent to the first tablet computer, the second tablet computer having a second bezel corresponding to a first area of the second touchscreen, wherein the second bezel is disposed along a first edge and at least one other edge of the second tablet computer;
    based at least in part on receiving the indication:
        causing, along the at least one other edge of the first tablet computer, display of a modified first bezel, wherein the modified first bezel is removed from at least a portion of the first edge of the first tablet computer; and
        causing, along the at least one other edge of the second tablet computer, display of a modified second bezel, wherein the modified second bezel is removed from at least a portion of the first edge of the second tablet computer that is adjacent to the first edge of the first tablet computer;
    establishing a common content area including the second area of the first touchscreen and a second area of the second touchscreen; and
    causing, by the first tablet computer, display of second content in the common content area based at least in part on establishing the common content area.

2. The computer-implemented method of claim 1, wherein displaying the second content comprises sending a request to the second tablet computer to display the second portion of the second content.

3. The computer-implemented method of claim 1, wherein causing display of the modified first bezel comprises animating disappearance of the first bezel along the portion of the first edge of the first tablet computer.

4. A computer-implemented method comprising:
    causing, by a first computing device, a first screen of the first computing device to display first content in a first area of the first screen;
    causing, by the first computing device, the first screen to display a first bezel in a second area of the first screen;
    receiving an indication that a second computing device having a second screen is within a predefined proximity to a first edge of the first computing device, the second computing device having a second bezel;
    causing, based at least in part on receiving the indication:
        display of a first modified bezel along at least one other edge of the first computing device, the first modified bezel being removed from at least a portion of the first edge of the first computing device; and
        display of a second modified bezel along at least one other edge of the second computing device, the second modified bezel being removed from at least a portion of a first edge of the second computing device that is adjacent to the first edge of the first computing device; and
    causing the first area of the first screen to extend closer to the first edge of the first computing device such that a common content area is established, the common content area including the first area and an area of the second computing device.

5. The computer-implemented method of claim 4, wherein causing display of the first modified bezel comprises:
    causing the first bezel to be removed along the first edge of the first computing device; and
    extending the first area to replace the first bezel along the first edge of the first computing device.

6. The computer-implemented method of claim 4, wherein the indication that the second computing device is within the predefined proximity is based at least in part on the second computing device physically touching the first computing device.

7. The computer-implemented method of claim 4, further comprising:
    causing display of second content in the common content area, wherein the second content is based at least in part on the first content such that a first portion of the second content is displayed on the first screen of the first computing device and a second portion of the second content is displayed on the second screen of the second computing device; and
    wherein causing display of the second content comprises modifying a layout of the first content.

8. The computer-implemented method of claim 7, wherein causing display of the second content comprises causing the first content to be moved or scaled.

9. The computer-implemented method of claim 4, wherein receiving the indication comprises receiving a response from a first magnetic switch in the first computing device and a second magnetic switch in the second computing device.

10. The computer-implemented method of claim 9, wherein causing display of the first modified bezel is based at least in part on the first magnetic switch in the first computing device being paired to the second magnetic switch in the second computing device.

11. The computer-implemented method of claim 4, wherein a size of the first modified bezel along at least a portion of the first edge of the first computing device is based at least in part on a distance between the second computing device and the first edge of the first computing device.

12. One or more non-transitory computer-readable storage media containing instructions written thereon that, when executed by one or more processors, cause the one or more processors to:
- cause a first screen of a first computing device to display:
  - first content in at least a first area of the first screen, and
  - a first bezel in a second area of the first screen, wherein the first bezel is adjacent to a first edge and at least one other edge of the first screen;
- receive an indication that a second computing device having a second screen is within a threshold distance to the first edge of the first screen;
- cause, based at least in part on receiving the indication;
  - display of a first modified bezel along the at least one other edge of the first screen, the first modified bezel being removed along at least a portion of the first edge of the first screen; and
  - display of a second modified bezel along at least one other edge of the second screen, the second modified bezel being removed along at least a portion of a first edge of the second screen that is adjacent to the first edge of the first computing device; and
- cause display of the first area of the first screen to extend closer to the first edge of the first screen and display of a first area of the second screen to extend closer to the first edge of the second screen to establish a common content area, the common content area including the first area of the first screen and the first area of the second screen.

13. The one or more non-transitory computer-readable storage media of claim 12, wherein:
- causing display of the first modified bezel comprises causing the first bezel to be removed along the first edge of the first screen; and
- causing display of the first area of the first screen to be extended closer to the first edge of the first screen includes causing display of the first area of the first screen to replace the first bezel along the first edge of the screen.

14. The one or more computer-readable storage media of claim 12, wherein the indication comprises a first indication, and the operations further comprise receiving a second indication that the second computing device is physically touching the first computing device.

15. The one or more computer-readable storage media of claim 12, further comprising:
- cause display of second content in the common content area, wherein the second content is based at least in part on the first content such that a first portion of the second content is on the first area of the first screen and a second portion of the second content is on at least a portion of the first area of the second screen; and
- wherein causing display of the second content comprises causing display of the first content with a modified layout.

16. The one or more computer-readable storage media of claim 15, wherein causing display of the second content comprises causing scaling the first content.

17. The one or more computer-readable storage media of claim 15, wherein causing display of the second content comprises causing the first content to be moved.

18. An apparatus comprising:
- a touchscreen;
- one or more computing processors coupled to the touchscreen; and
- one or more non-transitory computer-readable storage media containing instructions written thereon that, when executed by the one or more computing processors, perform the following operations:
  - causing the touchscreen to display first content in a first area of the touchscreen and a first bezel in a second area of the touchscreen, wherein the first bezel is adjacent to a first edge and at least one other edge of the touchscreen;
  - causing display of the first content within the first area of the touchscreen;
  - receiving an indication that a second apparatus is close to the first edge of the apparatus, the second apparatus having a second bezel disposed along a first edge and at least one other edge of the second apparatus;
  - causing display of the first area of the touchscreen to extend closer to the first edge such that a common content area is established, the common content area including the first area of the touchscreen and at least a portion of a screen of the second apparatus;
  - causing, based at least in part on establishing the common content area, display of a modified first bezel along the at least one other edge of the touchscreen, the modified first bezel being removed from at least a portion of the first edge of the touchscreen;
  - causing, along the at least one other edge of the second apparatus, display of a modified second bezel, wherein the modified second bezel is removed from at least a portion of the first edge of the second apparatus that is close to the first edge of the apparatus; and
  - causing display of second content in the common content area, wherein the second content is based at least in part on the first content such that a first portion of the second content is displayed on the first area of the touchscreen and a second portion of the second content is displayed on the screen of the second apparatus.

19. The apparatus of claim 18, wherein:
causing display of the modified bezel comprises causing the bezel to be removed along the first edge; and
causing the first area of the touchscreen to be extended closer to the first edge includes causing display of the first area to replace the bezel along the first edge.

20. The apparatus of claim 18, wherein receiving the indication is based at least in part on the second apparatus physically touching the apparatus.

21. The apparatus of claim 18, wherein causing display of the second content comprises causing display of the first content with a modified layout.

22. The apparatus of claim 18, wherein causing display of the second content comprises causing the first content to be moved or scaled.

* * * * *